US008458761B2

(12) United States Patent
Cordero et al.

(10) Patent No.: US 8,458,761 B2
(45) Date of Patent: Jun. 4, 2013

(54) RECEIVER

(75) Inventors: Rodrigo Cordero, Bristol (GB); Patrice Woodward, Fishponds Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 3414 days.

(21) Appl. No.: 10/167,242

(22) Filed: Jun. 11, 2002

(65) Prior Publication Data

US 2003/0076856 A1    Apr. 24, 2003

(30) Foreign Application Priority Data

Jun. 11, 2001 (EP) ..................................... 01305084

(51) Int. Cl.
*H04N 7/16* (2011.01)
(52) U.S. Cl.
USPC .......................................... 725/152; 725/143
(58) Field of Classification Search
USPC ................................... 725/100, 139, 151, 38
See application file for complete search history.

(56) References Cited

U.S. PATENT DOCUMENTS

| 6,651,250 B1* | 11/2003 | Takai ............................... 725/31 |
| 6,779,195 B2* | 8/2004 | Oishi et al. ....................... 725/68 |
| 2002/0066103 A1* | 5/2002 | Gagnon et al. .................. 725/60 |

FOREIGN PATENT DOCUMENTS

| EP | 0197356 A | 5/1999 |
| EP | 0 939 546 | 9/1999 |
| EP | 0939546 A | 9/1999 |
| GB | 2 347 309 A | 8/2000 |
| WO | WO 0108374 A | 2/2001 |
| WO | WO 0137546 A | 5/2001 |

OTHER PUBLICATIONS

European Search Report from European patent application No. 01309585.6 which claims priority to European patent application No. 01305084.4.
Co-pending U.S. Appl. No. 10/167,044, filed Jun. 11, 2002.
European Search Report from European patent application 01305084.4, filed Jun. 11, 2001.

* cited by examiner

*Primary Examiner* — Brian Pendleton
(74) *Attorney, Agent, or Firm* — Wolf, Greenfield & Sacks, P.C.

(57) ABSTRACT

A receiver for receiving a data stream comprises a filtering arrangement for filtering said received data stream and a processor. The filtering arrangement is arranged to load at least a part of said data stream, to filter at least part of said data stream and to read at least part of said data stream. The filtering arrangement has a first mode in which said steps are carried out and a second mode in which said processor is arranged to interrupt the steps carried out by said filtering arrangement.

16 Claims, 8 Drawing Sheets

RECEIVER

FIELD OF THE INVENTION

The present invention relates to a receiver and in particular a receiver for receiving a data stream.

BACKGROUND OF THE INVENTION

In digital television systems, the television is provided with a set top box to receive and decode a broadcast digital data stream which contains program information for display on the television. The broadcast digital data stream may arise at the set top box via a satellite or cable system, via a digital terrestrial system, or via disk or tape. A disk or tape, such as a CD ROM in a personal computer, may provide digital video information for display on the monitor.

There are various known standards for digital video broadcasting (DVB) and one now commonly used standard is the MPEG-2 standard.

In the MPEG-2 DVB standard, data is encoded into transport packets. Each transport packet is defined by the standard as consisting of 188 bytes, comprising four header bytes and 184 payload bytes ("the data payload"). For transmission, the transport packets are time division multiplexed into a transport stream. At the receiver in the set top box, the transport stream is demultiplexed to recover the transport packets. Optionally, the transport packets may be scrambled and encoded with error correction information for transmission and then descrambled and error checked at the receiver. The data payload in the transport packets is, according to the MPEG-2 standard, one of two types. The first type is known is a packetised elementary stream (PES), and the second type is known as program specific information (PSI).

The packetised elementary streams (PESs) form the video, audio and private data information of the broadcast. A PES packet may contain all sorts of data, audio or video and also other information such as teletext or other user defined general data. The MPEG-2 transport stream is made up of one or more PESs (either video, audio or private). The MPEG-2 transport stream is primarily intended for the transport of TV programs over long distances. This type of stream can combine, in the same multiplex, many programs, each of them being composed of one or more PESs. In order that the receiver can cope with this mix of program information, the MPEG-2 standard defines all types of tables, which together make up the MPEG-2 program specific information (PSI).

Each table of the PSI is made up of one or more sections, there being a maximum of 256 sections for each table. The MPEG-2 tables are defined in the standard, and include a program allocation table, a program map table, a conditional access table and private tables. The European DVB standard additionally defines complementary service information tables. The basic service information tables are the network information table, service description table, event information table, and time and date table. The optional service information tables are the bouquet association tables, running status tables, and stuffing tables. Each section includes an optional cyclic redundancy code (CRC) check.

A PES packet always starts at the beginning of the payload part of the transport packet and ends at the end of the transport packet. Sections, however, do not necessarily start at the beginning nor finish at the end of the transport packet. For a section, the transport packet can start with the end of another section.

At each decoder or set top box, the transport stream is decoded. To achieve the decoding of the transport stream, each set top box is provided with a transport interface, which provides an input interface between the transport stream input to the box and thin actual MPEG-2 decoders which decode the audio and video information and sections broadcast. The transport interface demultiplexes the transport stream to retain only those transport packets, which are required by the particular set top box for decoding. The transport stream is a set of different services time division multiplexed and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set top box is only interested in receiving packets having packet identifiers of interest to the particular set top box, for instance those associated with the particular television program selected for viewing. Thus, once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets but then filters the sections of the demultiplexed packets to retain only sections required by the receiver, before storing the filtered sections in the memory without further processing.

In order that the receiver can cope with this mix of program information, the MPEG-2 standard defines all types of tables, which together make up the MPEG-2 program specific information (PSI).

The transport interface performs, at the receiver, a number of demultiplexing operations. As stated hereinabove, initially the transport interface time demultiplexes a received transport stream. The data packets extracted from the time demultiplexed transport stream are then demultiplexed so as to retain only those data packets required by the particular receiver. These data packets may be audio or video information (IEPESs) or sections (IEPSI). Even though a data packet containing sections is demultiplexed by the receiver to be retained, it is possible that the information provided by the section is not required by the receiver. For instance the section may be associated with the table that is not of interest to the receiver, the sections may be associated with tables that have already been processed by the receiver, the sections may be versions of tables that have already been processed, or the sections may be associated with information relating to a specific set top box address which does not match the current set top box address, for example entitlement messages (ie ECM, EMM entitlement control message, entitlement management message).

It is therefore generally desirable to provide a further level of demultiplexing in the receiver so as to discard those sections of no interest to the receiver. In one known technique, the main processor of the receiver, after demultiplexing the transport packets identifies those which are sections and buffers the sections in the memory. The main processor then uses a content addressable memory (CAM) to determine whether any particular section should be retained or discarded. At least a part of the buffer section is compared with certain information stored in the CAM. This software implementation places an additional demand on the processing part of the main processor CPU of the receiver which becomes increasingly undesirable as the task required to be performed by the main processor CPU of the receiver increase and become more complex. Additionally, this processing by the CPU can be very slow. A header section search may for example be need to be done at least once every three bytes, checking a large number of filters, eg 48. This is done at a bit level and makes use of masking processes to search the different headers. The filter may have to deal with varying numbers of bytes. Furthermore, additional calculations are sometimes performed on the results.

A more automatic hardware solution has been proposed. This effectively is a hardware solution where the filters are preconfigured and, the processor does not perform any checks. This has the advantage in that the filtering can be accomplished quickly. However, because the filtering is implemented by hardware, this solution is not flexible. Thus, any changes which are required to the filtering cannot be accommodated. This means that changes in the broadcast standard may not be accommodated by the filtering. Additionally, further checks which may need to be done from time to time can also not be done.

SUMMARY OF THE INVENTION

Accordingly, it is an aim of embodiments of the present invention to provide a interface which addresses the problems described hereinbefore.

According to one aspect of the present invention there is provided a receiver for receiving a data stream, said receiver comprising a filtering arrangement for filtering said received data stream and a processor, said filtering arrangement being arranged to load at least a part of said data stream, to filter at least part of said data stream and to read at least part of said data stream, said filtering arrangement having a first mode in which said steps are carried out and a second mode in which said processor is arranged to interrupt the steps carried out by said filtering arrangement.

According to a further aspect of the present invention there is provided a method of receiving a data stream, said method comprising the steps of filtering in a filtering arrangement said received data stream, said filtering comprising loading at least a part of said data stream, filtering at least part of said data stream and reading at least part of said data stream, said filtering arrangement having a first mode in which said filtering steps are carried out and a second mode in which a processor is arranged to interrupt the steps carried out by said filtering arrangement.

BRIEF DESCRIPTION OF DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

In the following description the present invention is described with reference to an exemplary embodiment in which an MPEG-2 transport stream is demultiplexed in a programmable transport interface of a receiver in a digital set top box. It will be apparent, however, that the present invention is not limited to such an application and does in fact have broader applicability to other types of digital data and other types of application for example ATM address filtering, Ethernet address filtering or the like. Embodiments of the invention are particularly advantageous where high performance and real time processing is required.

Figure 1:
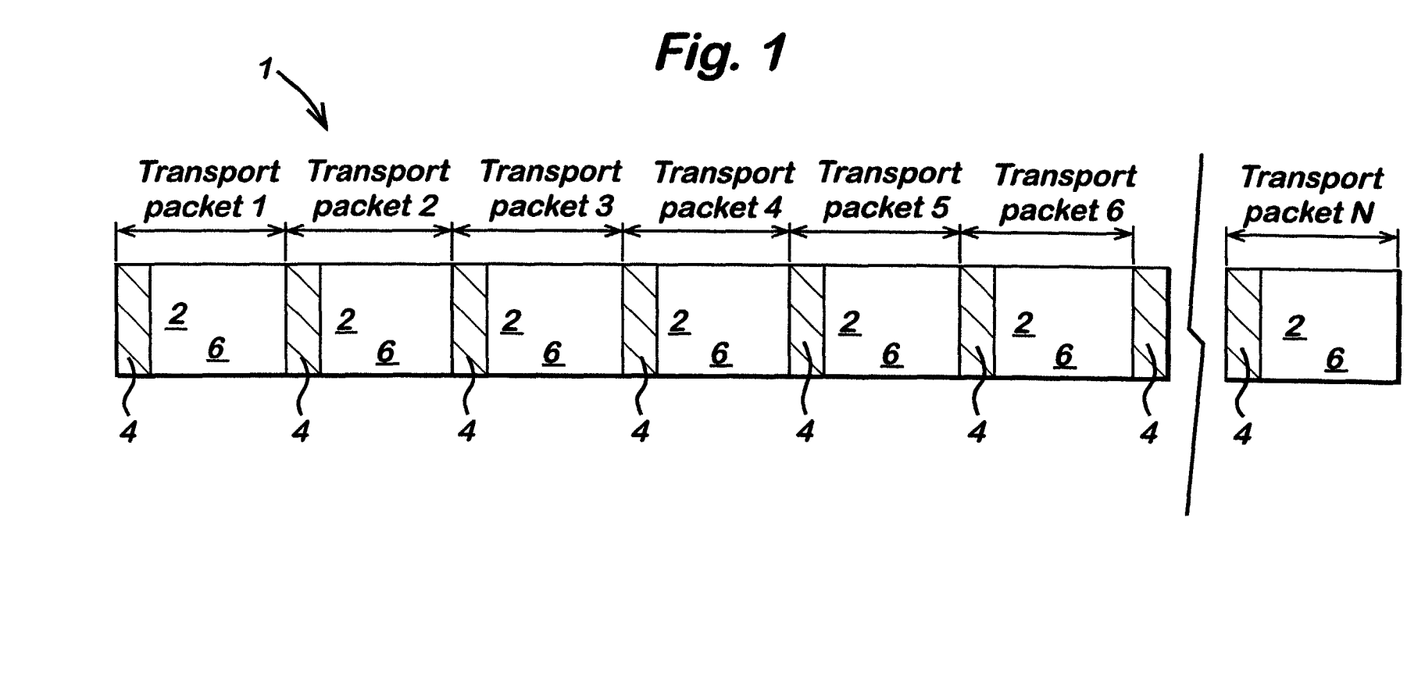
FIG. 1 illustrates a portion of the transport stream.

FIG. 1 illustrates a portion of a transport stream 1 which is composed of a series of n transport packets 2. Each transport packet 2 comprises a transport packet header 4 and a transport packet payload 6. The transport stream is a bit stream which carries in the transport packet payloads 6 information for recreating, for example, a number of different television programs. The transport stream is a stream of digital data.

The transport stream is formed by source encoding the television programs. The transport stream is then typically channel encoded for transmission (by satellite or cable) and channel decoded on its reception to reproduce the transport stream. The transport stream is then source decoded to recreate a selected one of the different television programs. Each particular television program requires three types of information (audio information, video information and tables of program information) for its recreation. Each transport packet 2 is preferably associated with a particular television program, a particular source encoding time and a particular one of the information types. The individual transport packets are time division multiplexed to form the transport stream and allow the real-time recreation of any one of the different television programs from the transport stream. To recreate a television program the transport stream is sequentially demultiplexed to recover only the transport payloads 6 of audio information, video information and tables of program information which are associated with the selected television program. The recovered payloads are then decoded and used to recreate the television program.

According to the MPEG-2 digital video broadcast (DVB) standard, each of the transport packet 2 is 188 bytes long and the transport packet header 4 is four bytes long. The transport packet payload 6 contains either audio or video information or sections. The sections are parts of tables. The audio and video information and the sections in the payloads 6 are packetised and encoded in accordance with MPEG-2 DVB compression standard.

Figure 2:
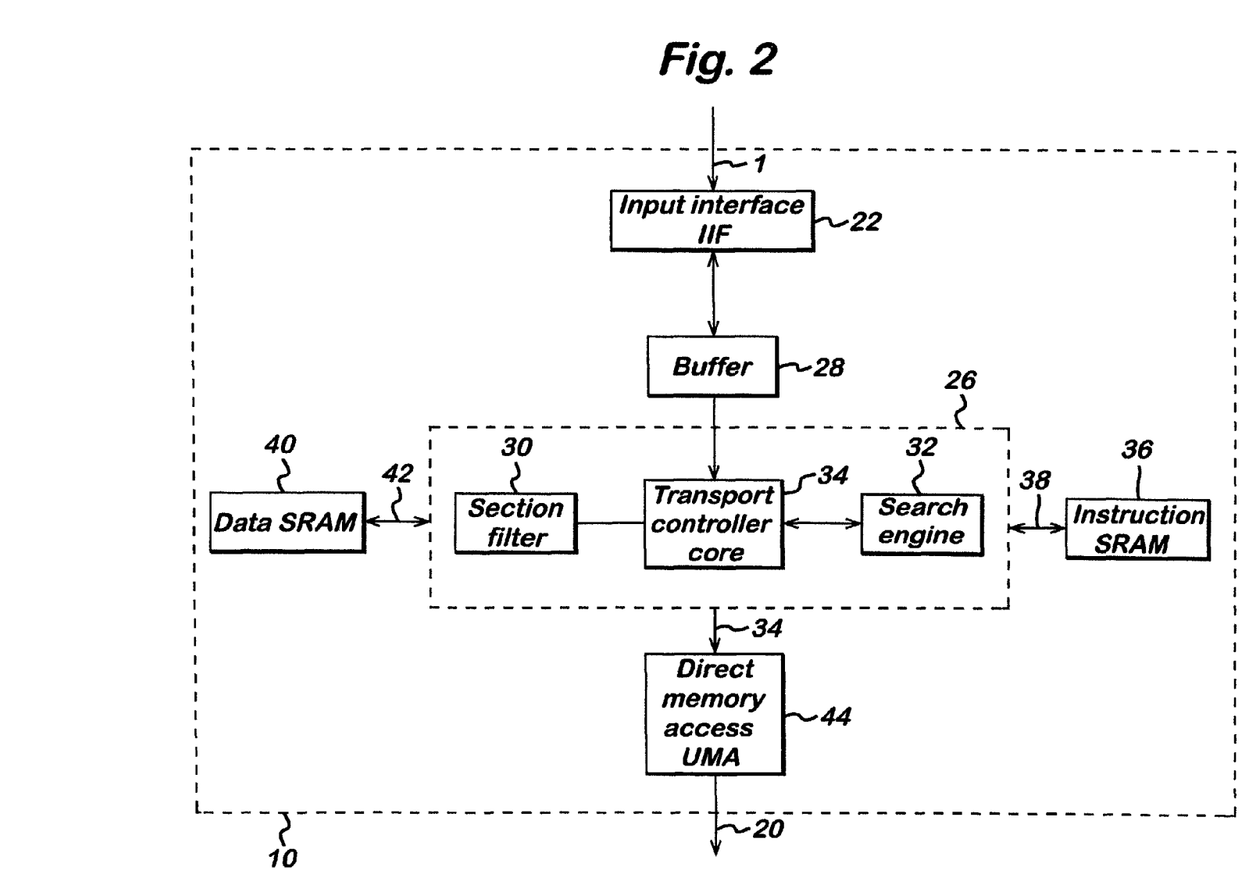
FIG. 2 illustrates in block schematic form a programmable transport interface.

Reference is made to FIG. 2 which shows a programmable transport interface. This interface is used to process a transport stream 1 and produce a data output stream suitable for reconstitution as a television program after MPEG-2 decoding by MPEG-2 decoders (not shown). The programmable transport interface 10 is included in a receiver which receives the transport stream 1.

The transport packet header contains a synchronisation byte which identifies the beginning of each transport packet 2. The transport packet header also contains a packet identifier (PID) which identifies the information type and the television program associated with the transport packet payload 6. The transport packet 2 also contains information identifying the source encoding time of the transport packet. The transport packet header 4, including the synchronisation byte and the PID, is not scrambled. The transport packet payloads 6 may be scrambled. The programmable transport interface (PTI) 10 performs various functions including:

1. Using the synchronisation byte to identify the start of the transport packet 2;
2. Using the packet identification (PID) to identify, amongst other functions, the type of information contained in the packet (i.e. audio or video information or sections) and the television program it represents;
3. Descrambling the transport packet payload 6; and
4. Demultiplexing the transport stream 1 to produce a data output stream 20.

The data output stream 20 comprises a stream of audio information associated with the selected television program, a stream of video information associated with the selected television program or tables of program information associated with the selected television program. The PTI outputs the streams to the necessary MPEG-2 decoder to reproduce the selected television program.

The programmable transport interface 10 comprises an input interface. The input interface 22 receives the transport stream 1. The input interface 22 identifies the synchronisation byte of each transport packet which is used to synchronise the system clock and the transport stream. The input interface 22 is controlled by the transport core 24 of a transport controller 26 via input interface control signals from the transport controller core to the input interface. The control signals may include a descrambling control signal and output stream control signals.

The input interface 22 provides bits to the transport controller 26 via a buffer 28. The buffer 28 is used to temporarily store data from the input interface, when required. The input interface 22, under the control of the transport controller core 24 descrambles the payload 6 of selected transport packets and supplies selected descrambled payloads to the transport controller 26.

The transport controller 26 comprises a section filter 30 and search engine 32 in addition to the transport controller core 24. The transport controller 26 operates on the bits received from the input interface 22. In particular, the transport controller 26 receives from the input interface 22 the transport packet header 4 of the transport packet 2 arriving at the input interface 22. The transport controller 26 uses the packet identifier in the transport packet header 4 to determine whether the transport packet 2 now entering the input interface is associated with the selected television program for the programmable transport interface 10. If it is not, the received transport packet 2 is discarded. If it is, it controls the input interface 22 to descramble, if necessary, the transport packet payload as described above, and to supply the transport packet payload 6 to the transport controller 26.

The transport controller 26 may pass a payload 6 associated with the audio or video information for the selected program straight to the transport controller output 34. If the payload relates to a section of a table the transport controller may further process the information before providing it at its output 34.

The transport controller core 24 of the transport controller 26 reads instruction sets from an instruction SRAM 36. The transport controller 26 is connected to the SRAM 36 by interconnect 38 and it reads its instructions via that interconnect. A system processor (not shown) may read and write to the instruction SRAM 36. However, the transport controller 26 has preferential access to the instruction SRAM 36 determined by an arbiter (not shown) which arbitrates between accesses by the transport controller 26 and the system processor.

The PTI 10 also comprises a data SRAM 40 which again can be accessed by the transport controller core 24. In particular, data is written to and read from the data SRAM 40 via interconnect 42. The search engine 32 is in the transport controller 26 is also able to read data from the data SRAM 40. The search engine 32 searches the data SRAM 40 for the packet identifiers in the incoming transport packet header 4. If the packet is not to be discarded, then the PID for that packet will have been stored in the data SRAM and is located by the search engine 32 of the transport controller 24. Associated with each packet identifier in the data SRAM 40 is a plurality of pointers, which point to other addresses in the data SRAM where other information associated with the incoming transport is stored.

The search engine retrieves the pointer stored with a particular packet identifier but used by the transport controller core 24. The transport controller core 24 then uses the pointers to access all the information it needs to process the payload of the incoming transport packet. The pointers may, for example, point to descrambling keys for use by the input interface 22, point to addresses for use by a direct memory access controller 44, identify whether the payload is video or audio information or sections, or identify whether the payload is special data to be output on an alternative output etc. Thus, the information obtained from the data SRAM 40 enables the transport controller to control the PTI 10.

The transport controller 26 produces the transport controller output 3 which is supplied to a multi channel direct memory access controller 44. The multi channel direct memory access controller 44 supplies the data output stream 20, indirectly, to the MPEG decoders (not shown).

Figure 3:
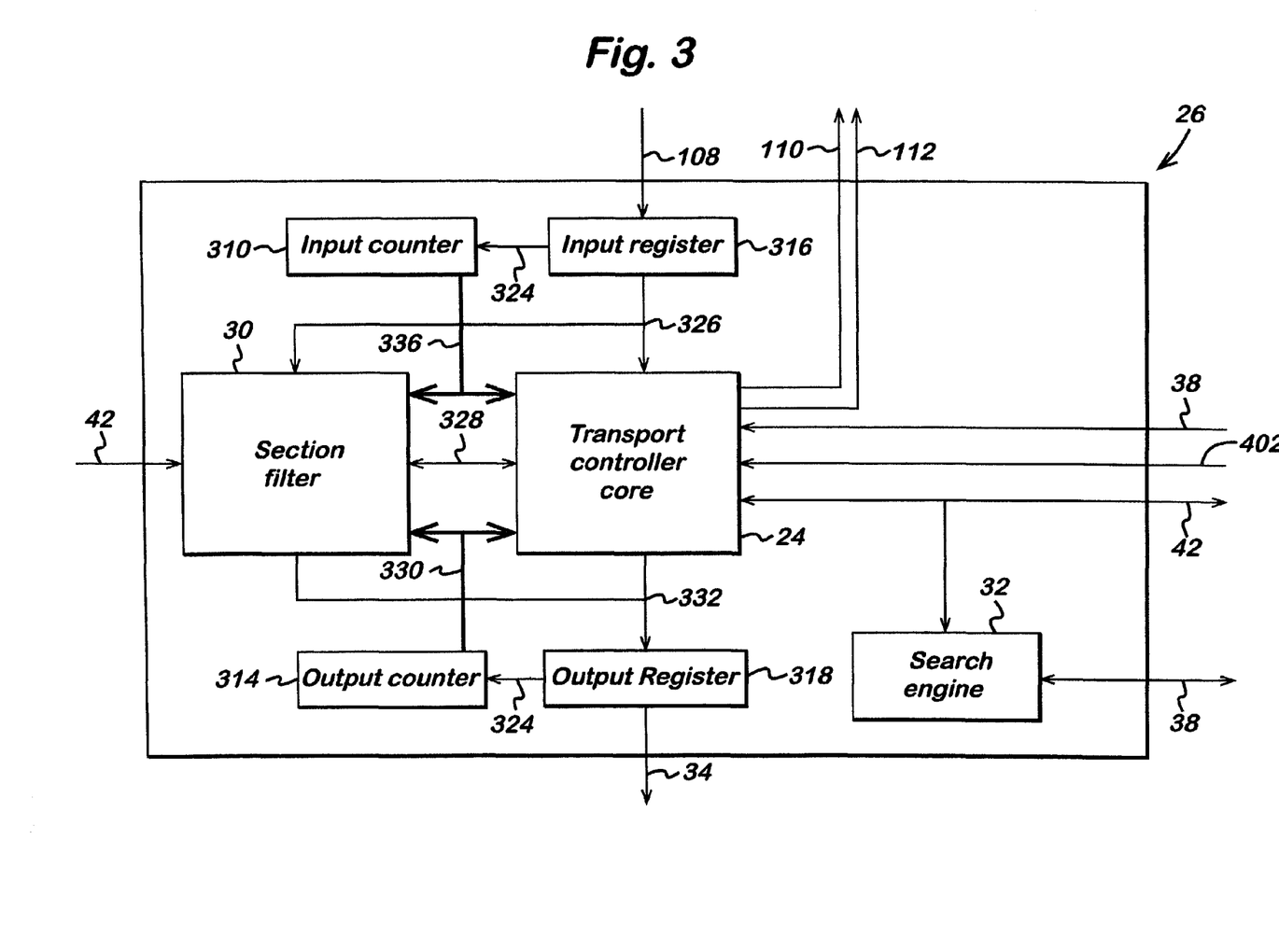
FIG. 3 shows the transport controller of the programmable transport interface of FIG. 2 in more, detail.

Referring now to FIG. 3, there is shown a block diagram of the main components of the transport controller which are the transport controller core 24, the section filter 30, an input register 316, an output register 318, an input counter 310, an output counter 314 and the search engine 32. The input register 316 receives the bits on the interconnect 108 and presents them on lines 326 to both the transport controller core 24 and the section filter 30.

Only one of the transport controller core 24 and the section filter 30 is able to grant the request from the input register. This is negotiated between the transport controller core and the section filter. The input register 316 also provides an input on line 324 to the input counter 310, and in turn the input counter 310 provides an input on line 336 to the transport controller core 24 and the section filter 30. The transport controller core 24 has bi-directional connections 328 to the section filter 30. As previously described, the transport controller core 24 is connected to the instruction SRAM 36 via the interconnect 38 and is connected to the system processor via the system interconnect bus 402. The transport controller core 24 also accesses the data SRAM via interconnections 42, the interconnections 42 also being connected to the search engine 32. The search engine 32 accesses the data SRAM via interconnection 38. The transport controller core provides an output on lines 332 which form an input to the output register 318, the output register 318 providing the output signals on interconnect 34. The output register 318 also provides a signal on line 334 which provides an input to the output counter 314. This output counter 314 in turn provides an output on signal line 330 to the transport controller core 24 and the section filter 30. The section filter 30 also has an output connected to line 332 to form an input to the output register 318. The section filter 30 can be accessed via the system processor via the system interconnect bus 402. The transport controller core 24 also outputs signals 112 and the signal 110 directly to the input interface 22.

The transport controller core 24 receives the transport header of the transport packet and the packet identity contained therein is used to demultiplex the incoming transport stream and access information associated with that PID contained in the data SRAM 40. The transport controller core 24 supplies the PID of the incoming transport header to the search engine 32 and the search engine 32 communicates with the data SRAM 40 via the bus 406 to search the data SRAM for the given PID. If the PID is not present in the data SRAM then the transport controller core 24 discards the transport packet. If the PID is present in the data SRAM 40, then the transport controller core 24 accesses an address in the data SRAM 40 identified by the search engine 32 and obtains parameters associated with that PID therefrom.

The information accessed from the data SRAM in dependence on the PID will, amongst other Parameters, identify whether the transport packets includes a section or whether it includes audio or video information. Embodiments of the present invention are concerned with the case where the incoming transport packet contains a section. If the incoming transport packet contains a section, then this section will need to be filtered to determine whether it is a section for use by the selected television program which is to be output by the transport controller.

Figure 4A:
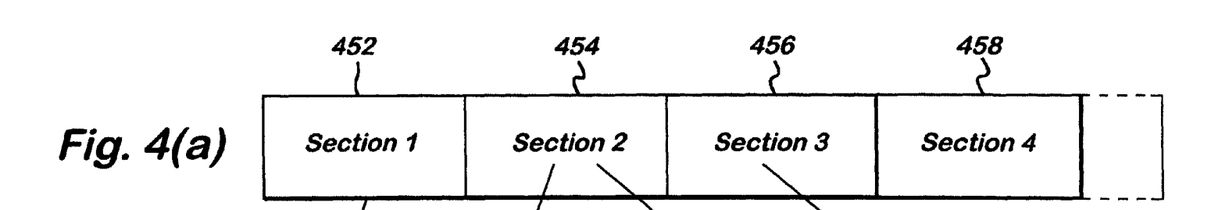
FIG. 4 illustrators the transport of sections in an MPEG-2 transport stream.
Figure 4B:
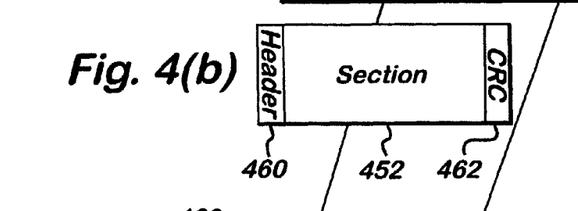

Reference will now be made to FIG. 4a, which shows a table comprising a plurality of sections 452 to 458, section 1 to section 4, prior to encoding for digital transmission. The table may comprise a much larger number of sections. For transmission in the transport stream, each section 452 to 458 is modified as shown in FIG. 4b. FIG. 4b shows section 1, 452 modified to include a header 460 and a cyclic redundancy code (CRC) check sum for 62. After encoding as shown in FIG. 4(b), each section of the table is multiplexed into the transport stream. Sections do not usually fit exactly into transport packets but are broken across transport packet boundaries into split sections.

It should be noted that the cyclic redundancy code check on the sections is optional.

Figure 4C:
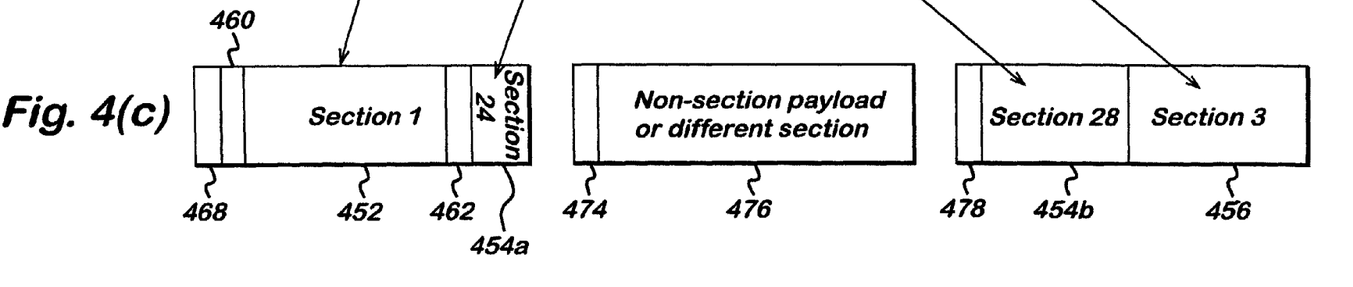

Referring to FIG. 4c, there is an example of a transport stream. The first transport packet comprises a packet header 468 and section 1 450 having section header 460 and section CRC 462. The first transport packet additionally includes a first part of section 2, 454a. The next transport packet of the transport stream includes a transport packet header 474 and a transport packet payload 476. However, the payload 476 is the second transport packet and not section payload i.e. video or audio information. Alternatively, the payload 476 may include sections associated with the different table other than that of FIG. 4a. Thereafter a third transport packet and the transport stream having a packet header 478 includes a second part of section 2, 452b of the table of FIG. 4a and section 3, 454 of the table of FIG. 4a. By way of example only, the first and third transport packets of FIG. 4c are shown transporting the second and third sections of the table without any cyclic redundancy code check.

The transport stream received at the input interface 22 is that shown in FIG. 4c. The PID of each transport packet is part of the transport controller core 24 and for a packet having a valid PID in a section contained therein, the transport controller core 24 will access information from the data SRAM indicating that the payload is a section. Thus, the transport controller core 24 controls at least the start of the section filtering of the section in the incoming transport packet.

Section filtering is preferably applied over a fixed or variable number of bytes at the start of the section. Multiple filters can be applied to one section or multiple sections applied to one filter or a set of filters. The PID, used by the transport controller core 24 to access information associated therewith determines the type of filtering to be done on the section in accordance with control information stored in the data SRAM 40. In general, any bit of the section filter is normally a match value or a "don't care" value i.e. always matches. Some other options may also be useful, for example the option to pass the section through the section filter even when the section filter does not detect a match.

The main purpose of section filtering is data rate reduction and specifically to reject information that is not of interest for further processing. In this way, the load on the main processor is reduced. Sections might be rejected by the section filter because they are associated with tables that are not of interest, the sections may be associated with tables that have already been processed, they may be versions of tables that have already been processed, or they may be associated with information related to a specific set top box address which does not match the current set top box address, for example entitlement messages.

Figure 5:
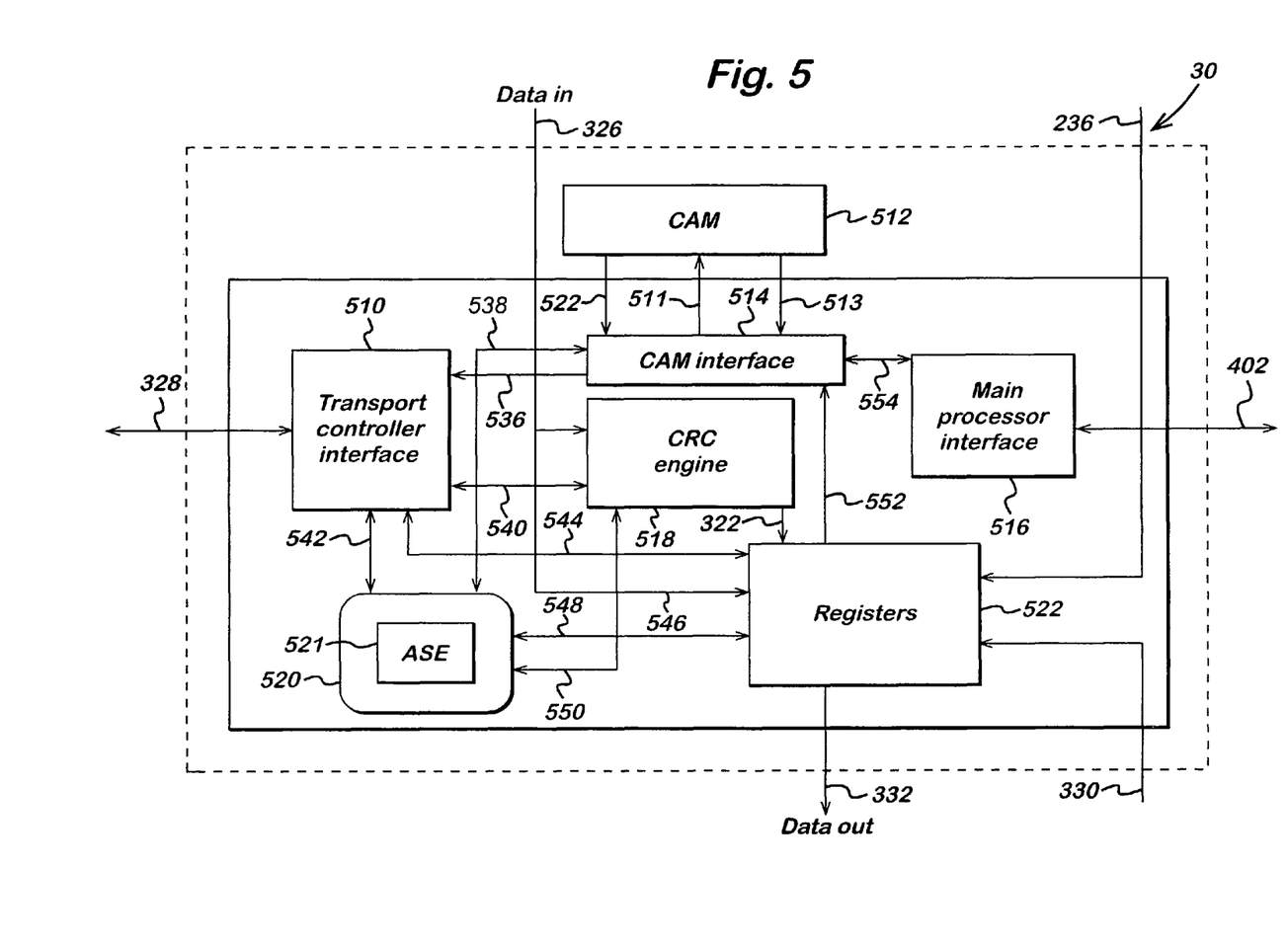
FIG. 5 illustrates a block diagram of a preferred implementation of a section filter according to the present invention.

Referring now to FIG. 5, the operation of the section filter 30 will now be described. The section filter 30 includes a content addressable memory (CAM) 512, a CAM interface 514, a transport controller interface 510, a main processor interface 516, a CRC engine 518, control logic 520 and registers 522. The CAM may be embedded in the section filter. The CAM interface applies inputs to the CAM 512 on signal lines 511 and receives outputs from the CAM 512 on signal lines 513. The CAM interface provides an interface to the CAM 512 for the transport controller core 24, the main processor and the control logic 520 and registers 522 of the section filter 30. The main processor interface 516 is connected to the main processor interconnect bus 402 and to the CAM interface 514 via interconnects 554. The transport controller interface 510 is connected to the transport controller interconnect 328 and receives signals from the CAM interface 514 on lines 536 and is interconnected to both the control logic 520 and CRC engine 518 respectively of the section filter 30 by interconnects 542 and 540.

The control logic 520 is connected to the CAM interface 514 by bi-directional signal lines 538. The control logic is additionally-connected to the CRC engines 518 via bi-directional signal lines 550 and the registers 502 via bi-directional signal lines 548. The registers 522 are connected to the CAM interface 514 via bi-directional signal lines 552. The input signals DATAIN on lines 326 form inputs to the CRC engines 518 and registers 522. The registers 522 output the output DATAOUT on lines 332. Additionally, the registers 522 receive the contents of the input counter 310 on line 336 and the contents of the output counter 314 on line 330. The CRC engine outputs a signal on line 558 to the registers 522. The control logic includes the automatic search engine 521 ASE. However in alternative embodiments of the invention, the ASE may be provided in alternative locations in the section filter or may be a separate entity.

Figure 6:
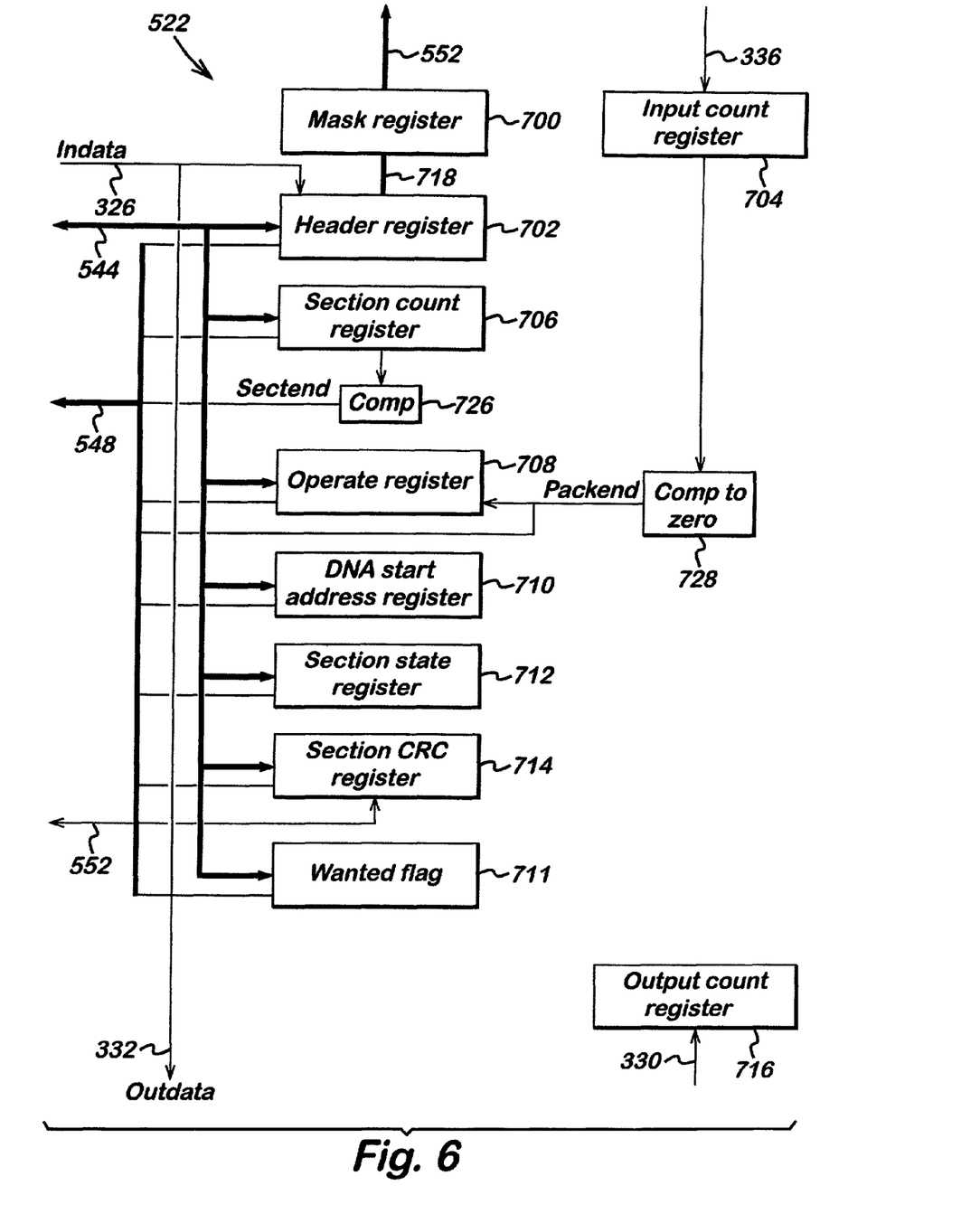
FIG. 6 illustrates the registers of the section filter.

Reference will now be made to FIG. 6 which shows the registers included in the section filter. The registers include a header register 702, a mask register 700, the section count register 706, an operate register 708, a DMA start address register 710, a section state register 712, a section CRC register 714, an input count register 704 and an output count register 716. The registers 552 additionally include two comparator circuits 726 and 728.

Each of the header registers 702, section count registers 706, DMA start register 710, section state register 712 and section CRC register 714 are connected through the bi-directional signal lines 544 to the transport controller interface 510. This enables the transport controller interface 510 to access these registers. The mask register 700 provides the output 552 to the CAM interface 514. The input to the mask register 700 is provided on lines 718 by the header register 701. The header register 702 receives an input, the input data DATAIN on lines 326 as well as control signals on lines 548 from the control logic 520. In addition, the header register 702 provides an output on line 720 to the section count register 706. The section count register 706 itself receives signals on line 548 from the control logic 520.

The operate register 708 receives control signals on lines 548 from the control logic 520 as does each of the DMA start address registers 710, the section state register 712, and the section CRC register 714. The section CRC register 714 additionally receives signals on line 558 from the CRC engine 518.

The header register 702 includes the first n bytes of a section, and the number of the bytes of the header inputted. n is a programmable and may be up to 18 bytes in one embodiment of the invention. The CRC register 714 holds the state of the CRC. The DMA start register 710 is used for CRC error recovery. The section count register 706 counts down as section bytes are read and also contains the number of remaining bytes of a section. The section state register 712 holds information relating to split section and also holds the status in which the section filter stopped. The operate registers 708 are arranged to configure the operation of the section filter, the filtering mode, breakpoints, CRC, section reporting mode and CAM result reporting mode. Additionally these registers start the section filter operation or assert manually a new section signal. They are self reset to 0 when finished. The mask register may be used to hold the output of part of the CAM if there is not a match with the current header, the output of a first part and/or a second part of the CAM from the last match result. Depending on the setting of a mask, a pre-masked result may be stored. The mask register may also have the mask to be ANDed with a first and/or a second part of the CAM and/or used to disable match values. This register can also be used for ECM and EMM specific values.

The first and second parts of the CAM may be separate CAMs.

Figure 7:
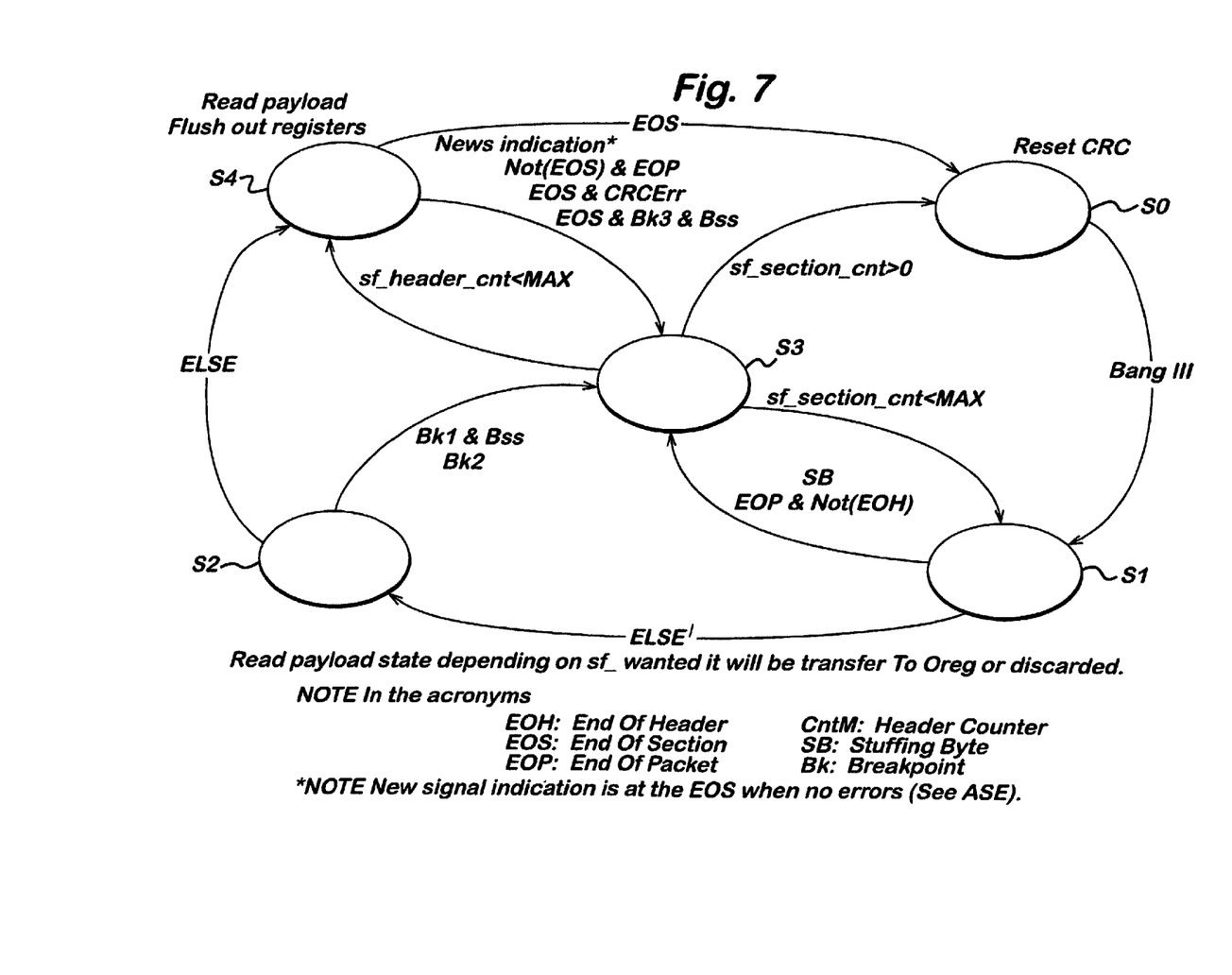
FIG. 7 shows a control diagram illustrating the operation of the section filter.

The operation of the section filter 30 will now be described with reference to FIGS. 6 and 7. FIG. 7 shows the flow control of the section filter and is provided by the automatic search engine ASE.

Referring to FIG. 4c, the transport stream illustrated therein arrives at the input interface 22, the first transport packet of which includes a first section of a table. As already described, the PID of the incoming transport packet is used by the transport controller core 24 to access information associated with such PID stored in the data SRAM. The information retrieved from the data SRAM will indicate that the transport packet associated with such PID includes section information. The controller core thus connects the output of the input register directly to the input of the section filter 312. In doing so the transport controller core 320 requests the remainder of the payload of the incoming transport packet by setting one of the signals on line 112 to the input interface 22.

Prior to transferring the data payload of the transport packet in section filter there will be a request/grant handshake protocol between the section filter 30 and the input interface 22.

The operate registers 708 define whether or not there are any break points set and, if so which break points. In particular, the operate registers 708 has three bits. The first bit indicates that the first break point is set, the second bit indicates that the second break point is set and the third indicates if the third break point is set. The break points will be discussed in more detail hereinafter. It should be appreciated that in some modes of operation, none of the break points will be set. The bits in the (operate register are set by the transport controller core 24. These operate registers which control the operation of the section filter. These configuration registers store masks which are to be applied to filter. Additionally these registers control the operations to be performed over the filters.

Once the transport controller core has set the operate register, the header of the section in the incoming transport packet is loaded into the header register 702 via the data input signal line DATA-IN 326 under the control of the control logic via signal lines 548. This corresponds to step S1 of FIG. 7. The number of bytes in a header of a section may vary according to the application and furthermore in some applications it may not be necessary to load the whole header into the header register 702. If in step S1 it is determined that what has been loaded is not a stuffing byte, is not an end of packet and is the end of header], then the next step will be step S2 which will be the filtering step.

If in the first step S1 the presence of a stuffing bit is determined, or the end of packet is determined or it is not the end of the header, then the next step is step S3 which is an idle step. If the end of packet is determined and the header is not finished, the system remains in the step S3 state until the header has been completed or there is valid packet. The system will alternatively stay in the step S3 state until a valid packet with no stuffing byte is provided. This may not be at an end of a packet. This step will be described in more detail hereinafter.

In the filtering step S2, when the appropriate byte of the header of the section of the incoming packet had been loaded into the header register 702, the value contained therein is output onto the signal lines 718 and applied to the mask register 700. The optional mask register 700 is configured as a filter enable according to the DVB standard being used. The filter enable mask serves to mask certain bits of the bytes stored in the header register 702 such that these bits are not enabled. The mask output of the header register 702 is then applied to the signal line 552 and applied to the CAM interface 514. The CAM interface 514 applies this mask value of the header via signal lines 511 to the CAM 512 to search for a match. The results of the CAM operation are output via the CAM 512 on a hit signal line 722 which is input to the CAM interface 514. If the CAM 512 finds the match of the mask header value then the hit signal on the line 722 is set. Otherwise the hit signal on line 722 is not set. In preferred embodiments of the present invention, there are two levels of masking. One level is to enable individually each of the bits within the mask register and the second one is to enable individually each of the lines to the mask register.

The CAM interface 514 outputs the result of the CAM operation on signal lines 538 to the control logic 520. The control logic 520 then loads a value into the section state register 712 via control lines 548 to indicate whether the results of the CAM operation has found a match. Thus the section state register 712 is indicative of whether the incoming section should be retained or discarded. Additionally, some common bit level operations are performed over the from which the decision is taken. Additional operations on the result or over the header bytes can be performed by the transport controller core with the use of the break points which will be discussed in more detail hereinafter.

In the normal operation of the section filter, the next step would be step S4. The data payload of the section included in the incoming transport packet should be transferred to the output of the section filter for transfer via the output register 318 to the output 502 without any further processing. Again, the section filter will implement a request/grant handshake, protocol with the output register before outputting the data payload of the section.

However, the idle step S3 will follow the filtering step S2 if the first or second break points has been set. Break point 1 is defined as occurring just after the section filter has loaded the last byte of a header and performed the filtering. It occurs prior to any outputting of bytes for the current section. In the preferred embodiment of the present invention, break point 1 will occur if it is configured to happen and the section header is loaded and passes the filtering. The idle step S3 effectively halts the filtering performed by the section filter so that the transport controller core can perform its own processes in respect of the data. In particular, the transport controller core is able to access the section filter header registers and perform additional filtering schemes. As the transport control core is effectively a processor, these additional filtering schemes may be implemented after the manufacture of the chip so that changes in the standard may be accommodated. Once the filtering algorithm has been completed by the transport controller core, the transport controller core needs to signify whether the section is going to be accepted or rejected. For this, a value section filter wanted flag register 711 is provided with one value of a bit indicating that the section is accepted and the other value of the bit indicating that the section is to be rejected. The wanted flag register is writable by the section filter and the transport controller core. The transport controller core can stop the section filter, during a break point, to reinitialise or modify the wanted flag register. In one embodiment of the present invention, writing a one to this tag and setting a section filter go bit high will result in the section filter resuming operation by outputting the header and payload of the section to the output register .... In other words, the next step will be step S4. The CRC may be checked and if the state machine or the ASE is configured to consider it, the state machine or ASE will inform the transport controller core that there is an error. This may or may not result in the removal of the already output data from the buffer. This may be dependent on the type of date. On the other hand, writing a zero to the tag and setting the section filter go bit will result in the section filter resuming operation by discarding the section header and payload. Effectively, that means that the next step will be step S0 which is the start of the process again and checking the next header. It is possible that the bytes inside the header register 702 can be modified by the transport controller core before they are output. The transport controller core can also decide to input the section payload byte by byte and modify it before it is output to the DMA. The correctly updated values need to be written to the section filter configuration registers before restarting for the next section. In other words the section length and state need to be updated to customise the operations over the filtering so that any filtering flavour or specific need can be performed by the PTI using the filtering hardware with very little overload for the transport controller.

In embodiments of the present invention, the breakpoints may be used to introduce indexing information in some of the sections or to modify some parts such as ECM and EMM.

In embodiment, of the present invention, a second break point is also defined. Break point 2 is similar to break point 1 except that it occurs regardless of the filtering output. It also takes place just after the section filter has loaded the last byte of the header and performed the filtering. It happens prior to any outputting of bytes for the current section. If breakpoint 2 is configured to happen, the section header is loaded, regardless of the filtering result and the next step is step S3. Again, the transport controller can now access the section filter header registers and perform additional filtering schemes. Once the filtering algorithm is completed, the transport controller again needs to signify whether the section is going to be accepted or rejected by writing the appropriate value to the section filter wanted tag. Writing a one to this tag and setting the section filter go bit high will again result in the section filter resuming operation by outputting the header and the payload of the section to the 0 register. Writing a zero to this tag and setting the section filter go bit will result in the section filter resuming operation by discarding the section header and payload. The former effectively results, in S4 being the next step Whilst the latter results in step S0 being the next step. As with breakpoint 1, the bytes inside the header registers can be modified by the transport controller before they are output. The transport controller can also decide to input to the section payload byte by byte and modify it before outputting it to the DMA. Again, the correctly updated values will need to be written to the section filter configuration register before restarting it or the next section.

In summary, if the filtering passes the value and neither of the break points are set, then the next step is S4. If in the filtering step, the filtering is successful and break point 1 is set, then the next step is S3. Regardless of the result of the filtering step, if the second breakpoint is set, then the next step is S3.

In preferred embodiments of the present invention, the data goes to the memory to be back buffered or the like. The data may have errors or may be a late discard by the transport controller core. The DMA has four pointers to control the flow, handshaking and size. The action of the ASE can be summarised by the following table:

| Stopping Reason | Header Hold | From State | To State |
| --- | --- | --- | --- |
| SB | No | Load Header | Load Header |
|  |  | Load Header | Idle |
|  |  | Idle | Start |
| Bk1 | Yes | Filtering | Filtering |
|  |  | Filtering | Idle |
|  |  | Idle | Read Payload |
| Bk1 | Yes | Filtering | Filtering |
|  |  | Filtering | Idle |
|  |  | Idle | Start |
| Bk2 | Yes | Filtering | Filtering |
|  |  | Filtering | Idle |
|  |  | Idle | Read Payload |
| Bk2 | Yes | Filtering | Filtering |
|  |  | Filtering | Idle |
|  |  | Idle | Start |
| Bk3 | No | Read Payload | Read Payload |
|  |  | Read Payload | Idle |
|  |  | Idle | Start |
| CRC Err | No | Read Payload | Read Payload |
|  |  | Read Payload | Idle |
|  |  | Idle | Start |
| EOP | No | Read Payload | Read Payload |
|  |  | Read Payload | Idle |
|  |  | Idle | Read Payload |
| EOP | Yes | Read Payload | Read Payload |
|  |  | Read Payload | Idle |
|  |  | Idle | Load Header |

At the same time that the transport controller core accesses the data SRAM using the PID of the incoming transport packet and requests that the remainder of the payload of the incoming transport packet from the input module, the transport controller core 320 communicates via interconnect 328 with the section filter to configure the DMA start address register 710. The transport controller core 320 writes into the DMA start address register 710, the first address location of where the section in the data payload should be written to the DMA controller if the section is to be retained.

If the result of the CAM operation is a match, then the control logic 520 controls the header register 702 and the section count register 706 via signal lines 548 to load into the section count register 706 from the header register 702 via line 720 the appropriate byte of the header register which indicates the length of the section This length may be identified preferably by the number of bytes included therein. Thus the section count register 706 identifies a number of bytes in the section which are to be transferred to the DMA controller. On every data payload section which is following the transport controller core accessing the appropriate PID in the data SRAM, to be transferred to the output 502 via the section filter or otherwise, the input counter 310, counts down the incoming transport packet as it passes through the input register 316. The input counter 310 is loaded with the value of the number of for example bytes at the incoming transport packet. Every byte which passes through the input register 316 then results in a decrement of the value stored in the input counter 310 by one value. Thus when the value of the input counter 310 reaches zero, the transport controller core identifies such by monitoring the value on line 336 and thus identifies the end of a transport packet. The input counter register 304 in the section filter 312 is connected directly to the output of the input counter 310 and merely mirrors the contents thereof. Thus the input counter register 704 provides a section filter 312 with the register so that it may monitor the value of the input counter to detect the end of a transport packet. The output counter register 314 is an upward counter which counts the data payload as it is output through the output register 318. Thus the output counter 314 provides an indication of the DMA address to which the current output byte of the data payload is to be stored relative to a base start address. The output counter 314 is indicative of the offset of the DMA start address to where the current data is to be stored. The output counter 716 of the section filter receives the contents of the output counter 314 on line 330 and thus is a mirror of the contents thereof.

The section comprising the data payload of the transport packet is thus output through the output register 318 to the DMA controller. This is in step S4. For each byte of the section which is output, the control logic 548 controls the value in the section count register 706 to be decremented by one value, i.e. in the preferred embodiment by one byte. When the value in the section count register 706 reaches zero, then the section has been successfully parsed and the section filter can cease operation. The comparator 726 monitors the value of the section count register 706 provided thereto of a line 730. When the comparator 726 identifies that the value in the section count register 706 is equal to zero, it sets its output SECTEND line 732. In terms of the figure shown in FIG. 6, this corresponds to the end of section and the next step is step S0. The end of section signal forms an input to the control logic 520 via signal lines 548. The comparator circuit 728 receives via signal lines 736 the value in the input count register 704. As with the comparator 726, the comparator 728 compares the current value of the input count register 704 to see whether it has reached zero. In the event that the value in the output count register 704 reaches zero then the comparator 728 sets the signal END OF PACKET on line 734 to indicate that the packet has ended. This signal end of packet on line 734 is input to the control logic 520 via lines 548.

In response to the signal SECTEND on line 732 from the comparator 726, the control logic 548 will check the current status of the signal end of packet on line 734. In the event that the signal END OF PACKET is not set, indicating that the packet is not ended, then the control logic will load the next set of bytes entering into the section filter on lines 326 into the header register 702 under the control of the signals 548, since these bytes will be the header bytes of a second section of the table. In other words, the next stage after step S4 would be step S1 which would go via step S3. The operation described hereinabove for comparing the header bytes in the CAM 512 will be repeated, in step 1 and in the event that a successful match is found the bytes of the section will pass through the DMA controller.

When the end of the incoming packet is reached, the value in the input counter 704 will reach Zero and the comparator 728 will send the signal end of packet on line 734. In response to the signal END OF PACKET on line 734, the control logic 520 will reset the operate register 708 to indicate an inactive state. Furthermore, the transport controller core 320 itself monitors the state of the operate register 708 and in response to the inactive state being set will identify the end of the section filter operation. If an end of packet signal is received and it is also the end of the section, then the process is ended and the next stage will be the start step S0. If, however it is not the end of a section but only the end of a packet, then the next step after step S4 will be the idle step S3 and thereafter the first step S1. The transport controller core monitors the state of the operate register 708, and in response to the inactive state being set will identify the end of the section filter operation. In response to the ends of the section filter operation, the transport controller core will access the contents of certain registers in the section filter 312 and restore them in the data SRAM with the appropriate PID.

Transport controller core accesses the contents of the header register 702, section count register 706, the DMA start address register 710, section state register 712 and section CRC register 714 of the section filter 312 via signal connections 544 of the section filter 312 and stores them in the data SRAM for the data area associated with the PID of the transport packet which is to be parsed. Thus, when a further transport packet arrives, which has the same PID and the continuing section information associated with the first transport packet, the transport controller 320 can reload the values of all of these registers in the section filter and the section filter can recommence pathing of the appropriate section. In other words, step S1 can continue.

The section filter also preferably provides for error detection by provision of the CRC engine 518. The CRC engine calculates the CRC of the transport packet being parsed including sections as it receives the transport packet on line 326. The CRC engine 518 keeps the current value of the CRC check stored in the section CRC register 714 of the register 522 which it accesses via signal line 558. When the control logic 520 detects the end of a packet by detecting the END OF PACKET signal on line 734 being set, it sends a control signal on line 550 to the CRC engine 518 to perform a check of the CRC of the received transport packet. The CRC engine 518 performs a check by comparing the CRC value it hard itself calculated and stored in the section CRC register 714 with the CRC check sum appended to the received section. If the CRC engine detects an error, then it is signals such to the control logic 520 via signals 550.

If an end of section is determined and a CRC error is checked, then the next step after step S4 will be the idle step S3.

A third break point can be defined. The third break point occurs after the payload of an accepted section has been output by the section filter. It happens prior to the input of any bytes of the next section. It also happens after the CRC has been calculated but prior to the reset of the CRC state or the assertion of a new section. If the third break point is configured to happen, the current section is accepted and has been output. In other words, step S3 will be the next step.

In summary, whenever step S3 is the next step, the transport controller core is able to provide further filtering, alter values or provide any other required function in respect of the data.

If the section filter header count is less than a maximum value, then the next step after step 3 will be step S1 again. If, on the other hand, the section filter header count is equal to the maximum value, then the next step after S3 will be S4.

If the section filter section counters equal to zero, then the next stage after stage S3 will be the start step S0. The start stage S0 also results in the CRC being reset.

If after the header has been loaded, it is determined that the payload contains the stuffing byte, then the next step after step S1 is step S3. Likewise, if it is determined that after a header has been loaded in stage S1 that it is the end of a packet and not the end of the header then the next stage will be stage S3.

Reference will now be made to the following table:

| automatic process | stopping reason Stuffing byte | stopping reason breakpoint 1 | stopping reason breakpoint 2 | stopping reason breakpoint 3 | stopping reason CRC error |
|---|---|---|---|---|---|
| header loaded | no | yes | yes | yes | yes |
| filtering | no | yes | yes | yes | yes |
| header flushed/ outputted | no | no | no | yes | yes |
| payload read | no | no | no | yes | yes |
| CRC calculated | no | no | no | yes | yes |
| CRC resetting | no | no | no | no | no |
| new section indication | no | no | no | no | no |

The automatic process which corresponds to steps S1 followed by step S2 followed by step S4 followed by step S0 and so on can be summarised by the following processes. In step S1 the header is loaded. In step S2 the filtering is carried out. In step S4 the header is flushed or output as required and the payload is read. The CRC is calculated. In the next step S0, the CRC is reset and it is determined if there is a new section indication.

If a stuffing bit is detected, then none of the processes in the automatic processing are carried out.

If break point 1 is set, then the process effectively consists of stage S1 and S2, that is the header is loaded and then filtered. None of the other processes are set.

The same is true if the second break point is set. It should be appreciated that for both break point 1 and break point 2, if set, the CRC will be calculated if the end of header and end of packet is detected.

If break point 3 is set, then the process consists of steps S1, S2 and S4, that is loading of the header, filtering, flushing of the header, reading of the payload and calculating of the CRC.

If a CRC error is detected, then the same steps are carried out as are for break point 3. When, a CRC error is detected and the section filter is programmed to stop, the transport controller core has to be decides if the data is to be accepted or rejected. The section filter will stop and if the data is to be rejected the transport controller core will indicate this to the DMA. If the third breakpoint has been set or the CRC is not set, the section filter will continue with the next: packet (unless it is at the end of a packet) automatically.

Reference is made to the following table which shows the section filter state register format in more detail.

| Function |
|---|
| The result of the section matching in the CAM (Filter passed) |
| Indicates that the SF stopped after a CRC error in the last section output |
| Indicates that the SF has stopped because it has reached the end of the transport packet |
| Indicates that the SF has found a stuffing byte |
| Indicates that the SF stopped on break point 1 |
| Indicates that the SF stopped on break point 2 |
| Indicates that the SF stopped on break point 3 |

Reference is made to the following table which shows the section filter configuration register format in more detail.

| Function |
|---|
| '0' forces SF to work in automatic mode |
| '1' forces SF to work in manual mode |
| When high, enables breaking point 1 |
| When high, enables breaking point 2 |
| When high, enables breaking point 3 |
| Indicates the mode in which the filter is used |
| '0' select CRC32 for section validation |
| '1' select CRC16 for PES payload validation |
| When high, ASE perform a crc check on all sections. This overrides bit 9 and the syntax indicator bit in the header |
| When high, ASE do not consider crc result for decisions. Flag is still applied. This overrides the syntax indicator bit in the header |
| 'FF' byte is outputted after the section payload if crc is incorrect |
| '00' will be outputted when it is correct (remainder of crc calculator) |

Figure 8:
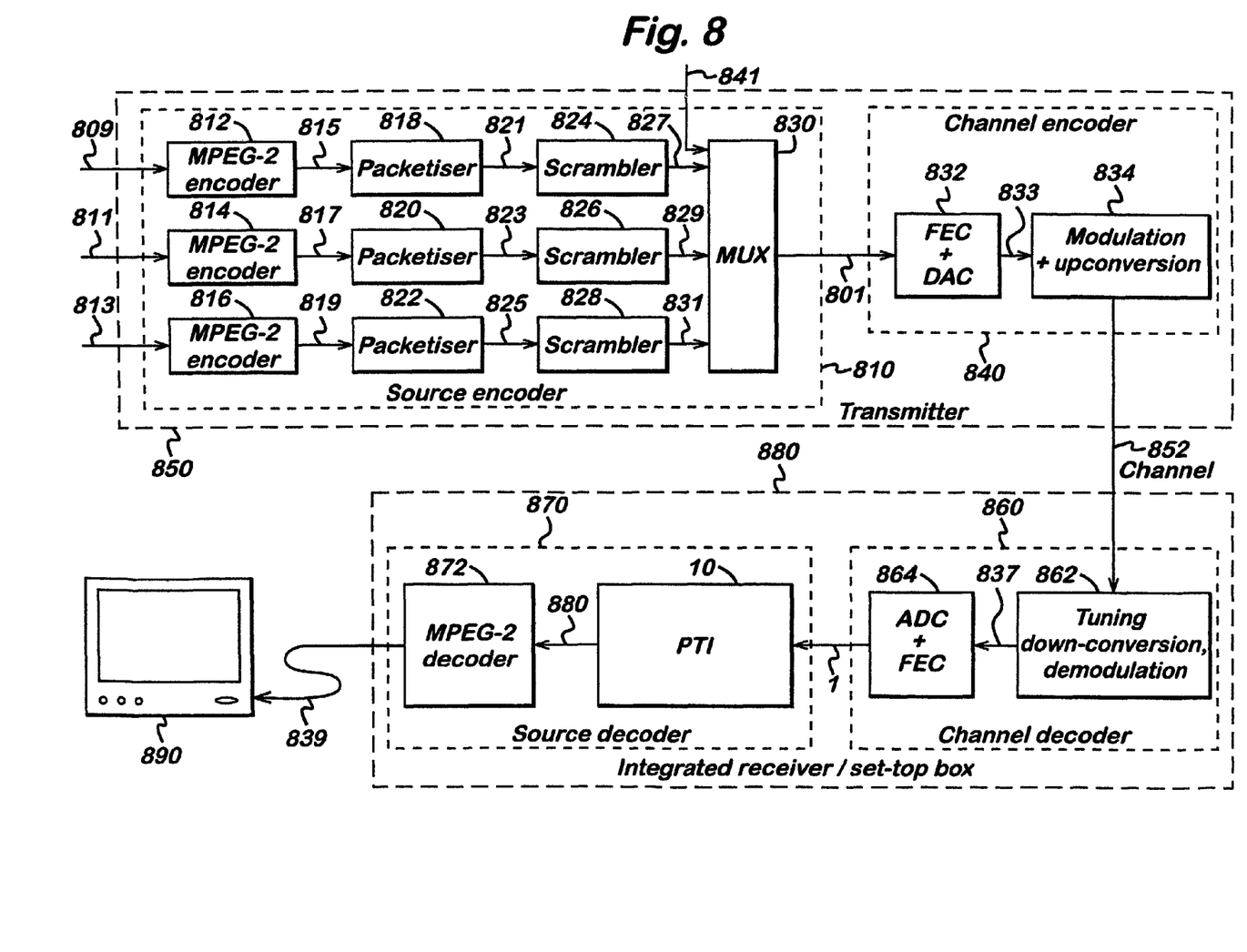
FIG. 8 shows a digital video broadcast system incorporation a programmable transport interface embodying the present invention.

FIG. 8 illustrates| how digital television signals 809, 811 and 813 can be transmitted Via a cable, satellite or terrestrial television channel 852 and be viewed on a television 890. The first, second and third television signals 809, 811 and 813 each represent the audio and video signals necessary to recreate a television program for input to a television. The digital television signals 809, 811 and 813 are source encoded and channel encoded by a transmitter 850 to produce a modulated analogue signal for transmission on the channel 852. An integrated receiver decoder (also known as a set top box 880) receives the modulated analogue signal from the channel 852 and produces a video signal which operates the television 890.

The operation of the transmitter 850 will now be explained. The transmitter includes a source encoder 810 and a channel encoder 840. The source encoder includes first, second and third MPEG 2 encoders 812, 814 and 816, first, second and third packetisers 818, 820 and 822, first, second and third scrambler, 824, 826 and 828 and a multiplexer 830.

First, second and third MPEG-2 encoders respectively receive first 809, second 811 and third 813 television signals and encode the signals to produce first, second and third elementary bit streams 815, 817 and 819. The first 818, second 820 and third 822 packetisers respectively receive first 815, second 817 and third 819 elementary bit streams and packetise the elementary bit streams to produce first, second and third packetised elementary bit streams (PES) 821, 823 and 825. The packetising of an elementary bit stream includes creating series of packets which contain a packet head and a data portion, but which do not have any fixed length The first, second and third scramblers respectively receive first, second and third packetised elementary bit streams and produce first, second and third scrambled packetised elementary bit streams. Each of the scramblers scrambles only the data portion of each packetised elementary bit stream it receives and does not scramble the packet header.

The multiplexer 830 receives as inputs packetised sections of tables on line 841 and the first, second and third scrambled PES 827, 829 and 831 and produces a transport stream from one of its inputs on line 801. The packetised sections with tables 841 contain information which allows the set top box 880 to effect source decoding and produce the video signals 839. The information is stored in a tabular form where each table contains a number of sections and each section is transmitted individually.

The multiplexer 830 produces the transport stream 801 such as that illustrated in FIG. 1. The transport stream includes a number of transport packets with each transport packet containing a transport header 4 and a transport packet payload 6. Transport packets have a fixed length. In the MPEG-2 digital video broadcast (DVB) standard the transport packet is 188 bytes in length. Transport packets are shorter in length than the packets in the packetised elementary stream. Consequently a packet from the first scrambled PES 827 will be spread over a number of transport packets and these transport packets will be multiplexed with the transport packets derived from the packetised sections in tables 841 and the second and third scrambled PES 829, 831. The transport stream is then supplied on line 801 to the channel encoder 840 to produce the modulated analogue signal for transmission on the channel 852.

The channel encoder 840 includes a circuitry 832 for forward error correcting (FEC) the transport stream on line 801 and a digital to analogue converter for converting the signal from the digital to analogue domain to produce an analogue signal 833. The analogue signal 833 is modulated and up converted to a transmission frequency by the circuitry 834 to produce the modulated analogue signal which is then transmitted into the channel 852. The signal may alternatively be modulated in the digital domain.

The operation of the set top box 880 will now be described The set top box 880 includes a channel decoder 860 and a source decoder 870. The channel decoder 860 receives a modulated analogue signal on the channel 852 and produces the transport stream 1 which it supplies to the source decoder 870. The Channel decoder 860 includes circuitry 862 for tuning to the modulated analogue signal on the channel 852 and for down converting and demodulating the modulated analogue signal on the channel 852 to produce an analogue signal 837. The analogue signal 837 is converted from analogue to digital in an analogue to digital converter and forward error corrected by the circuitry 864 to reproduce the transport stream 1.

The source decoder 870 receives the transport stream 1 and produces the video signal 839. The source decoder 870 includes the programmable transport interface 10 and MPEG-2 decoder 872. The PTI 10 demultiplexes the transport stream 1, selects the transport packets 2 carrying information relating to a particular television program, and descrambles the selected transport packet to produce a data output stream 880, which is in fact the packetised elementary bit stream associated with the selected television program. It should be appreciated that the transport stream may not have been received via a cable or satellite connection and may have been received by the software register 204. The MPEG-2 decoder 872 receives the data output stream 880 and produces the video signal 839 which is supplied to the television 890. The television 890 displays the selected program.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A receiver for receiving a data stream, said receiver comprising a filtering arrangement for filtering said received data stream and a processor, said filtering arrangement being arranged to load at least a part of said data stream, to filter at least part of said data stream and to read at least part of said data stream, said filtering arrangement having a first mode in which said steps are carried out and a second mode in which said processor is arranged to interrupt the steps carried out by said filtering arrangement and to filter at least part of said data stream.

2. A receiver as claimed in claim 1, wherein said second mode is defined to occur when one or more conditions occur.

3. A receiver as claimed in claim 1, wherein said steps carried out by the filtering arrangement are interrupted after said filtering.

4. A receiver as claimed in claim 3, wherein said steps carried out by the filtering arrangement are interrupted after said filtering if the data stream has successfully passed said filtering.

5. A receiver as claimed in claim 4, wherein said steps are interrupted after the reading step.

6. A receiver as claimed in claim 1, wherein said processor is arranged in said second mode to alter at least part of said data stream.

7. A receiver for receiving a data stream, said receiver comprising a filtering arrangement for filtering said received data stream and a processor, said filtering arrangement being arranged to load at least a part of said data stream, to filter at least part of said data stream and to read at least part of said data stream, said filtering arrangement having a first mode in which said steps are carried out and a second mode in which said processor is arranged to interrupt the steps carried out by said filtering arrangement and to perform additional filtering schemes.

8. A receiver as claimed in claim 1, wherein any remaining steps are completed by said filtering arrangement after said interruption by said processor.

9. A receiver as claimed in claim 1, wherein the filtering arrangement comprises hardware to carry out said steps.

10. A receiver as claimed in claim 1, wherein the processor has software for carrying out processing following an interruption.

11. A receiver as claimed in claim 1, wherein said data stream is an MPEG data stream.

12. A receiver as claimed in claim 11, wherein program specific information is processed by said filtering arrangement.

13. A set top box incorporating a receiver as claimed in claim 1.

14. An integrated circuit incorporating a receiver as claimed in claim 1.

15. A method of receiving a data stream, said method comprising the steps of: filtering in a filtering arrangement said received data stream, said filtering comprising loading at least a part of said data stream, filtering at least part of said data stream and reading at least part of said data stream, said filtering arrangement having a first mode in which said filtering steps are carried out and a second mode in which a processor is arranged to interrupt the steps carried out by said filtering arrangement and to filter at least part of said data stream.

16. A method of receiving a data stream, said method comprising steps of: filtering in a filtering arrangement said received data stream, said filtering comprising loading at least a part of said data stream, filtering at least a part of said data stream, and reading at least a part of said data stream, said filtering arrangement having a first mode in which said filtering steps are carried out and a second mode in which a processor is arranged to interrupt the steps carried out by said filtering arrangement and to filter at least a part of said data stream and perform additional filtering schemes.

* * * * *